(12) United States Patent
Budnick et al.

(10) Patent No.: US 10,329,936 B2
(45) Date of Patent: Jun. 25, 2019

(54) GAS TURBINE ENGINE AFT SEAL PLATE GEOMETRY

(71) Applicant: United Technologies Corporation, Farmington, CT (US)

(72) Inventors: Matthew Budnick, Hudson, NH (US); Conway Chuong, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 277 days.

(21) Appl. No.: 14/909,513

(22) PCT Filed: Jul. 18, 2014

(86) PCT No.: PCT/US2014/047144
§ 371 (c)(1),
(2) Date: Feb. 2, 2016

(87) PCT Pub. No.: WO2015/020775
PCT Pub. Date: Feb. 12, 2015

(65) Prior Publication Data
US 2016/0186589 A1 Jun. 30, 2016

Related U.S. Application Data

(60) Provisional application No. 61/862,996, filed on Aug. 7, 2013.

(51) Int. Cl.
*F01D 11/00* (2006.01)
*F02C 7/28* (2006.01)
(Continued)

(52) U.S. Cl.
CPC .......... *F01D 11/005* (2013.01); *F01D 11/001* (2013.01); *F01D 15/10* (2013.01);
(Continued)

(58) Field of Classification Search
CPC ........ F02C 7/28; F01D 11/001; F01D 11/005; F01D 15/10; F01D 25/24; F01D 25/246;
(Continued)

(56) References Cited

U.S. PATENT DOCUMENTS

| 5,281,097 A | 1/1994 | Wilson et al. |
| 6,575,703 B2 | 6/2003 | Simeone et al. |

(Continued)

FOREIGN PATENT DOCUMENTS

| EP | 1369552 | 12/2003 |
| EP | 2912274 | 6/2010 |
| EP | 2565395 | 3/2013 |

OTHER PUBLICATIONS

International Search Report and Written Opinion for PCT/US2014/047144 dated Nov. 7, 2014.

(Continued)

*Primary Examiner* — Carlos A Rivera
*Assistant Examiner* — Sang K Kim
(74) *Attorney, Agent, or Firm* — Carlson, Gaskey & Olds, P.C.

(57) ABSTRACT

A gas turbine engine includes an engine static structure. A fairing is supported relative to the engine static structure and configured to provide a flow path surface of a flow path extending in an axial direction. A seal plate has first and second ends radially spaced from one another with respect to the axial direction. The first end is operatively secured to the engine static structure. The second end is configured to seal relative to the fairing. The seal plate includes a portion between the first and second ends that extends substantially in the axial direction and configured to permit the second end to move away from the fairing in the axial direction relative to the first end in response to thermal growth.

12 Claims, 2 Drawing Sheets

(51) Int. Cl.
*F01D 25/24* (2006.01)
*F01D 15/10* (2006.01)

(52) U.S. Cl.
CPC ............... *F01D 25/24* (2013.01); *F02C 7/28* (2013.01); *F05D 2220/30* (2013.01); *F05D 2220/76* (2013.01); *F05D 2240/55* (2013.01)

(58) Field of Classification Search
CPC .. F01D 25/28; F05D 2220/30; F05D 2220/76; F05D 2240/14; F05D 2240/55
See application file for complete search history.

(56) References Cited

U.S. PATENT DOCUMENTS

| | | |
|---|---|---|
| 8,186,692 B2 | 5/2012 | Durocher et al. |
| 8,371,812 B2 | 2/2013 | Manteiga et al. |
| 2003/0005705 A1 | 1/2003 | Chan et al. |
| 2008/0050229 A1 | 2/2008 | Durocher et al. |
| 2010/0132370 A1 | 6/2010 | Durocher et al. |
| 2010/0132374 A1* | 6/2010 | Manteiga ................ F01D 9/02 60/796 |
| 2010/0135777 A1 | 6/2010 | Manteiga et al. |
| 2013/0078080 A1 | 3/2013 | Durocher et al. |
| 2014/0241857 A1* | 8/2014 | Chuong .................... F02C 7/28 415/111 |
| 2014/0248127 A1* | 9/2014 | Chuong .................... F02C 7/28 415/111 |

OTHER PUBLICATIONS

Supplementary European Search Report for European Application No. 14835036.6 dated Mar. 20, 2017.

International Preliminary Report on Patentability for International Application No. PCT/US2014/047144 dated Feb. 18, 2016.

\* cited by examiner

GAS TURBINE ENGINE AFT SEAL PLATE GEOMETRY

CROSS-REFERENCE TO RELATED APPLICATIONS

This application claims priority to U.S. Provisional application No. 61/862,996, which was filed on Aug. 7, 2013.

BACKGROUND

This disclosure relates to aft seal plate geometry for use in, for example, an industrial gas turbine engine.

Turbomachines, such as gas turbine engines, typically include a turbine section, a compressor section, and a combustor section. The compressed air is mixed with fuel and combusted in the combustor section. The products of combustion are expanded in the turbine section. In the case of an industrial gas turbine engine, the turbine section includes a power turbine, which is arranged downstream from a turbine that drives the compressor. The power turbine rotationally drives a generator to produce electricity.

In one type of industrial gas turbine engine, a flow path is provided between the power turbine and the upstream turbine. A fairing provides an inner flow path surface. A forward end of the fairing is fixed with respect to engine static structure, and an aft end of the fairing is free to float axially in response to thermal growth. An aft seal plate is secured relative to the engine static structure and provides a seal with respect to the fairing's free end. The aft seal plate is an annular structure and extends linearly in an aftward direction from an inner end secured to the engine static structure to an outer end that seals relative to the free end. During some engine operating conditions, the aft seal plate and free end may undesirably collide.

SUMMARY

In one exemplary embodiment, a gas turbine engine includes an engine static structure. A fairing is supported relative to the engine static structure and configured to provide a flow path surface of a flow path extending in an axial direction. A seal plate has first and second ends radially spaced from one another with respect to the axial direction. The first end is operatively secured to the engine static structure. The second end is configured to seal relative to the fairing. The seal plate includes a portion between the first and second ends that extends substantially in the axial direction and configured to permit the second end to move away from the fairing in the axial direction relative to the first end in response to thermal growth.

In a further embodiment of the above, the flow path includes inner and outer flow path surfaces. The inner flow path surface provides the flow path surface.

In a further embodiment of the above, the flow path is arranged axially between first and second turbines.

In a further embodiment of the above, the second turbine is a power turbine coupled to a generator.

In a further embodiment of the above, circumferentially spaced apart vanes extend in a radial direction and interconnected to the inner and outer flow path surfaces.

In a further embodiment of the above, a seal is provided between the fairing and the seal plate.

In a further embodiment of the above, a forward end of the seal plate is secured relative to the engine static structure. The aft end of the fairing is free to float in the axial direction.

In a further embodiment of the above, the seal plate includes, first, second and third portions transverse to one another. The second portion corresponds to the portion.

In a further embodiment of the above, the first and second portions are perpendicular to one another.

In a further embodiment of the above, the second portion is oriented within +/− ten degrees with respect to the axial direction.

In a further embodiment of the above, the first portion is perpendicular to the axial direction.

In a further embodiment of the above, the axial direction is parallel to a rotational axis of a turbine.

In a further embodiment of the above, the third portion is canted forward toward the fairing.

In a further embodiment of the above, a finger seal is secured to the second end that provides a seal with respect to the engine static structure.

In another exemplary embodiment, a seal plate for a gas turbine engine includes an annular wall provided about an axis and extending between first and second ends that are radially spaced from one another with respect to the axis. The first end includes an axially extending pilot. The second end included an axially extending flange and an adjacent annular seal seat. The wall includes a portion between the first and second ends that extends substantially in the axial direction and is configured to permit the second end to move axially relative to the first end in response to thermal growth.

In a further embodiment of the above, the seal plate includes, first, second and third portions transverse to one another. The second portion corresponds to the portion.

In a further embodiment of the above, the first and second portions are perpendicular to one another.

In a further embodiment of the above, the second portion is oriented within +/− ten degrees with respect to the axial direction.

In a further embodiment of the above, the first portion is perpendicular to the axial direction.

In a further embodiment of the above, second portion extends aftward from the first portion. The third portion extends from the second portion and is canted forward.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
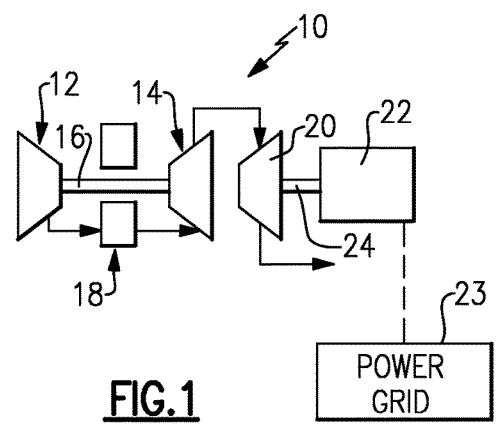
FIG. 1 is a schematic cross-sectional view of an example industrial gas turbine engine.

A schematic view of an industrial gas turbine engine 10 is illustrated in FIG. 1. The engine 10 includes a compressor section 12 and a turbine section 14 interconnected to one another by a shaft 16. A combustor 18 is arranged between the compressor and turbine sections 12, 14. A power turbine 20 is arranged downstream from the turbine section 14. The power turbine 20 rotationally drives a generator 22 via a shaft 24. The generator 22 is connected to a ground-based power grid 23 to provide electricity. It should be understood that the illustrated engine 10 is highly schematic, and may vary from the configuration illustrated. Moreover, the disclosed seal plate may be used in commercial and military aircraft engines as well as industrial gas turbine engines.

Figure 2:
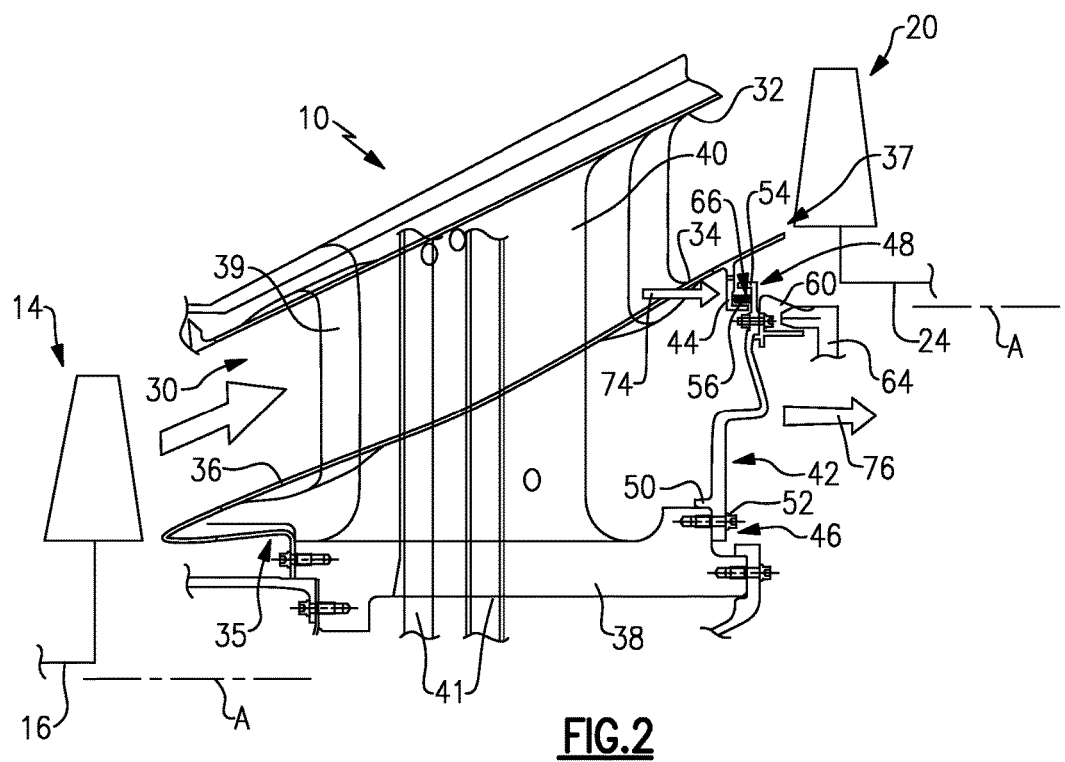
FIG. 2 is a schematic view of a portion of the gas turbine engine shown in FIG. 1.

Referring to FIG. 2, a flow path 30 is provided between the turbine 14 and the power turbine 20, both of which rotate about a rotational axis A, which corresponds to an axial direction. The flow path 30 is provided by outer and inner flow surfaces 32, 34. The inner flow surface 32 is provided by a fairing 36 secured to an engine static structure 38. In the example, a forward end 35 of the fairing 36 is secured to the engine static structure 38, and an aft end 37 is free to float and expand axially with respect to the engine static structure to accommodate thermal growth during engine operation. In one example, circumferentially spaced vanes 39 extend radially between and join the outer and inner flow surfaces 32, 34. Struts 40 pass through the vanes 39 and interconnect engine static structure 38 as well as permit other structures 41, such as lubrication conduits, bleed air and/or wires, to pass through the flow path into the interior of the engine.

An aft seal plate 42 is secured relative to engine static structure 38 at a first end 46. The aft seal plate 42 is provided by an annular wall arranged about the axis A and that extends in a radial direction from the first end 46 to a second end 48. The aft seal plate 42 seals relative to a flange 44 provided on the aft end 37 to enclose that rear of the turbine section 14.

Figure 4:
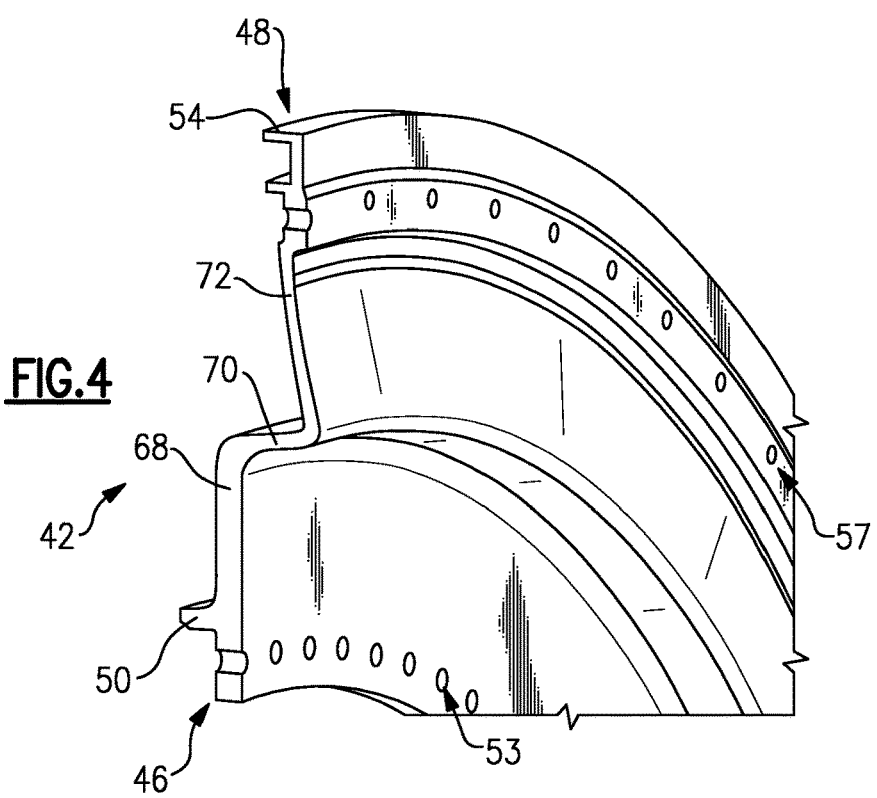
FIG. 4 is a cross-sectional perspective view of the aft seal plate shown in FIG. 3.

An axially extending pilot 50 is provided at the end 46 to radially locate the aft seal plate 42 relative to the engine static structure 38. The first end 46 is secured to the engine static structure 38 using fasteners 52 that extend through holes 53 (FIG. 4).

With continuing reference to FIG. 2, a flange 54 is provided at the second end of 48 adjacent to an annular seal seat. A seal 56, such as a W seal, is supported on the seal seat and provided between the flanges 44, 54 to prevent a fluid or air flow leaking through a gap 66 and migrating to other regions of the engine 10. A finger seal 60 is secured to the second end 48 with fasteners 59 that extend through holes 57 (FIG. 4) in the second end 48. The finger seal 60 includes seals about a portion 64 of the engine structure associated with the power turbine, as shown in FIG. 2.

With continuing reference to FIG. 2, the hollow arrow 74 illustrates the fairing thermal growth during engine operation, which moves the flange 44 in the aft direction as depicted in FIG. 2. The aft seal plate 42 includes a geometry that encourages the flange 54 to also move in the axial direction, as indicated by the hollow arrow 76, to prevent the flanges 44, 54 from colliding with one another during engine operation.

Figure 3:
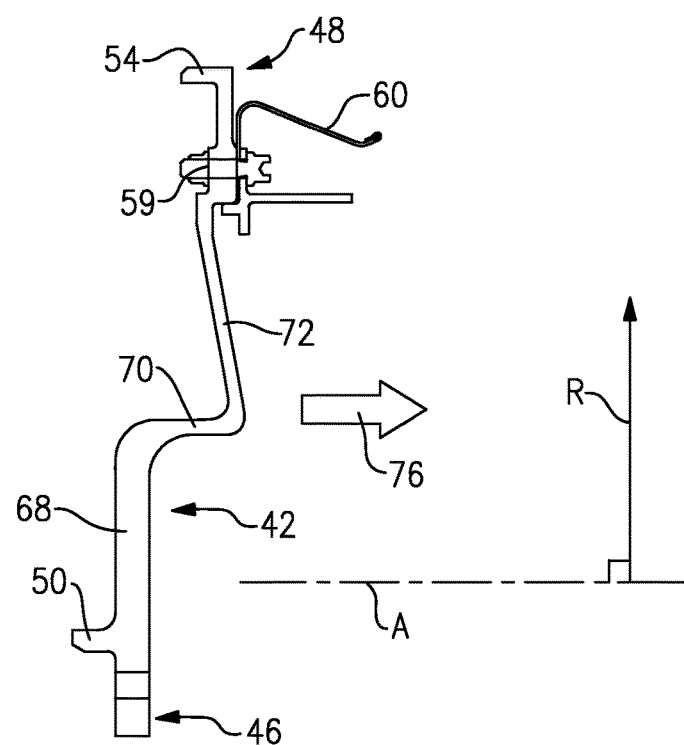
FIG. 3 is an enlarged cross-sectional view of an aft seal plate shown in FIG. 2.

Referring to FIG. 3, the aft seal plate 42 includes first, second, and third portions 68, 70, 72. The first portion 68 extends in a radial direction R with respect to the axial direction, which limits the overall axial deflection of the aft seal plate 42. In one example, the first portion 68 is perpendicular to the axial direction. The second portion 70 extends substantially in the axial direction, that is, +/− ten degrees with respect to the axial direction. In the example shown, the second portion 70 is parallel to the axial direction and perpendicular to the first portion 68. The third portion 72 may be oriented as desired to position the flange 54 with respect to the fairing flange 44 based upon the given engine application. In one example, the third portion 72 is transverse to the first and second portion 68, 70 and canted forward, rather than rearward, with respect to the radial direction R. The orientation of the third portion 72 pulls the seal seat and flange 54 aftward under thermal deflections, which accommodates and matches the axial thermal growth of the aft end 37.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
an engine static structure;
a fairing supported relative to the engine static structure and configured to provide a flow path surface of a flow path extending in an axial direction; and
a seal plate having first and second ends radially spaced from one another with respect to the axial direction, the first end operatively secured to the engine static structure, and the second end configured to seal relative to the fairing, wherein the seal plate includes, first, second and third portions, wherein the first portion is transverse to the second portion and the second portion is transverse to the third portion, the second portion is arranged between the first and second ends extending substantially in the axial direction and configured to permit the second end to move away from the fairing in the axial direction relative to the first end in response to thermal growth, wherein the third portion extends from the second portion to a flange on the second end, the flange extends in the axial direction, and the third portion is canted forward toward the fairing, and the first portion extends to the first end.

2. The gas turbine engine according to claim 1, wherein the flow path includes inner and outer flow path surfaces, the inner flow path surface providing the flow path surface.

3. The gas turbine engine according to claim 2, wherein the flow path is arranged axially between first and second turbines.

4. The gas turbine engine according to claim 3, wherein the second turbine is a power turbine coupled to a generator.

5. The gas turbine engine according to claim 2, comprising circumferentially spaced apart vanes extending in a radial direction and interconnected to the inner and outer flow path surfaces.

6. The gas turbine engine according to claim 1, comprising a seal at the second end provided between the fairing and the seal plate.

7. The gas turbine engine according to claim 6, wherein a forward end of the seal plate is secured relative to the engine static structure and aft end of the fairing is free to float in the axial direction.

8. The gas turbine engine according to claim 1, wherein the first and second portions are perpendicular to one another.

9. The gas turbine engine according to claim 1, wherein the second portion is oriented within +/− ten degrees with respect to the axial direction.

10. The gas turbine engine according to claim 1, wherein the first portion is perpendicular to the axial direction.

11. The gas turbine engine according to claim 1, wherein the axial direction is parallel to a rotational axis of a turbine.

12. The gas turbine engine according to claim 1, comprising a finger seal secured to the second end that provides a seal with respect to the engine static structure.

\* \* \* \* \*